(12) United States Patent
Jakobsson

(10) Patent No.: US 11,463,274 B2
(45) Date of Patent: *Oct. 4, 2022

(54) THIRD PARTY APPLICATION ENABLEMENT FOR NODE NETWORKS DEPLOYED IN RESIDENTIAL AND COMMERCIAL SETTINGS

(71) Applicant: Amber Semiconductor, Inc., Dublin, CA (US)

(72) Inventor: Bjorn Markus Jakobsson, Portola Valley, CA (US)

(73) Assignee: Amber Semiconductor, Inc., Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,978

(22) Filed: Nov. 7, 2019

(65) Prior Publication Data

US 2020/0145247 A1 May 7, 2020

Related U.S. Application Data

(66) Substitute for application No. 62/756,863, filed on Nov. 7, 2018.

(51) Int. Cl.
*H04L 12/28* (2006.01)
*H04L 67/00* (2022.01)
*H04L 67/53* (2022.01)

(52) U.S. Cl.
CPC ...... *H04L 12/2825* (2013.01); *H04L 12/2834* (2013.01); *H04L 67/34* (2013.01); *H04L 67/53* (2022.05)

(58) Field of Classification Search
CPC . H04L 12/2825; H04L 12/2834; H04L 67/20; H04L 67/34
See application file for complete search history.

(56) References Cited

U.S. PATENT DOCUMENTS 6,756,998 B1 6/2004 Bilger
7,610,616 B2 10/2009 Masuouka et al.
(Continued)

OTHER PUBLICATIONS

Stajano et al., "The Resurrecting Duckling: Security Issues for Ad-hoc Wireless Networks," International Workshop on Security Protocols, 1999, 11 pages.

(Continued)

*Primary Examiner* — William G Trost, IV
*Assistant Examiner* — Abdelbasst Talioua
(74) *Attorney, Agent, or Firm* — Ryan, Mason & Lewis, LLP

(57) ABSTRACT

An apparatus in an illustrative embodiment comprises at least one processing device comprising a processor coupled to a memory. The processing device is configured to receive sensor data from one or more nodes of a node network, to compute predicate data based at least in part on the received sensor data, to transmit at least a portion of the received sensor data and the computed predicate data to a third party application, to receive additional data from the third party application responsive to the transmitted portion of the received sensor data and the computed predicate data, to generate a control signal based at least in part on the received sensor data, the computed predicate data, and the received additional data from the third party application, and to transmit the control signal to at least one of the nodes of the node network. Other illustrative embodiments include methods and computer program products.

20 Claims, 3 Drawing Sheets

(56) References Cited

U.S. PATENT DOCUMENTS

| | | | |
|---|---|---|---|
| 9,990,786 B1 | 6/2018 | Ziraknejad | |
| 11,295,735 B1* | 4/2022 | Anuar | H04L 67/53 |
| 2007/0143826 A1 | 6/2007 | Sastry et al. | |
| 2009/0203355 A1 | 8/2009 | Clark | |
| 2012/0190386 A1* | 7/2012 | Anderson | H04L 67/306 |
| | | | 455/456.3 |
| 2012/0311035 A1* | 12/2012 | Guha | G06Q 30/08 |
| | | | 709/204 |
| 2013/0300534 A1 | 11/2013 | Myllymaki | |
| 2014/0096272 A1 | 4/2014 | Makofsky et al. | |
| 2014/0266698 A1 | 9/2014 | Hall et al. | |
| 2015/0282223 A1 | 10/2015 | Wang et al. | |
| 2015/0355649 A1 | 12/2015 | Ovadia | |
| 2015/0363563 A1* | 12/2015 | Hallwachs | G16H 40/67 |
| | | | 705/3 |
| 2016/0035159 A1 | 2/2016 | Ganapathy Achari et al. | |
| 2016/0232318 A1* | 8/2016 | Mensinger | A61B 5/0002 |
| 2016/0277528 A1* | 9/2016 | Guilaume | G06Q 30/0206 |
| 2016/0343083 A1* | 11/2016 | Hering | G06F 21/50 |
| 2016/0374134 A1 | 12/2016 | Kweon et al. | |
| 2017/0026194 A1 | 1/2017 | Vijayrao et al. | |
| 2017/0033942 A1 | 2/2017 | Koeninger | |
| 2017/0099647 A1 | 4/2017 | Shah et al. | |
| 2017/0171802 A1 | 6/2017 | Hou et al. | |
| 2017/0195130 A1 | 7/2017 | Landow et al. | |
| 2017/0212653 A1 | 7/2017 | Kanojia et al. | |
| 2017/0230193 A1 | 8/2017 | Apte et al. | |
| 2017/0251014 A1* | 8/2017 | Eisen | G06F 11/3495 |
| 2017/0366950 A1 | 12/2017 | Abron | |
| 2018/0061158 A1 | 3/2018 | Greene | |
| 2018/0174076 A1 | 6/2018 | Fukami | |
| 2018/0183685 A1* | 6/2018 | Cook | H04W 4/08 |
| 2018/0287802 A1* | 10/2018 | Brickell | H04L 9/3247 |
| 2018/0301006 A1 | 10/2018 | Flint et al. | |
| 2018/0307859 A1* | 10/2018 | LaFever | H04L 63/20 |
| 2018/0342329 A1 | 11/2018 | Rufo et al. | |
| 2018/0359039 A1 | 12/2018 | Daoura et al. | |
| 2018/0359223 A1 | 12/2018 | Maier et al. | |
| 2019/0020477 A1* | 1/2019 | Antonatos | H04L 9/0894 |
| 2019/0026493 A1* | 1/2019 | Ukena-Bonfig | H04L 63/0421 |
| 2019/0028869 A1 | 1/2019 | Kaliner | |
| 2019/0036928 A1 | 1/2019 | Meriac et al. | |
| 2019/0050903 A1 | 2/2019 | DeWitt et al. | |
| 2019/0068716 A1 | 2/2019 | Lauer | |
| 2019/0087835 A1* | 3/2019 | Schwed | H04L 63/0421 |
| 2019/0104138 A1 | 4/2019 | Storms et al. | |
| 2019/0253243 A1 | 8/2019 | Zimmerman et al. | |
| 2019/0268176 A1 | 8/2019 | Pognant | |
| 2019/0334999 A1 | 10/2019 | Ryhorchuk et al. | |
| 2020/0106637 A1* | 4/2020 | Jakobsson | H04L 12/2812 |

OTHER PUBLICATIONS

L. Sweeney, "Simple Demographics Often Identify People Uniquely," Carnegie Mellon University, Data Privacy Working Paper 3, 2000, 34 pages.

Narayanan et al., "Robust De-anonymization of Large Sparse Datasets," The University of Texas at Austin, 2009, 15 pages.

* cited by examiner

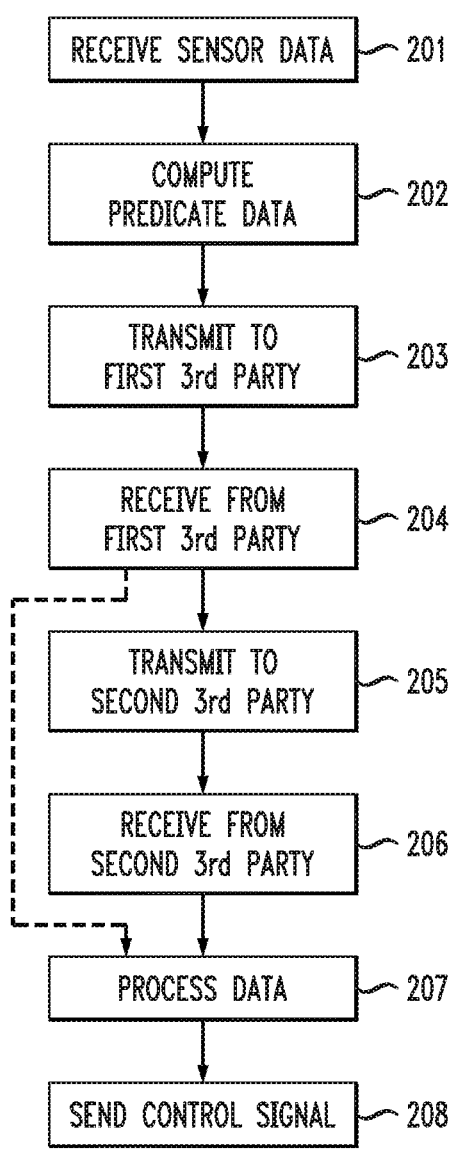

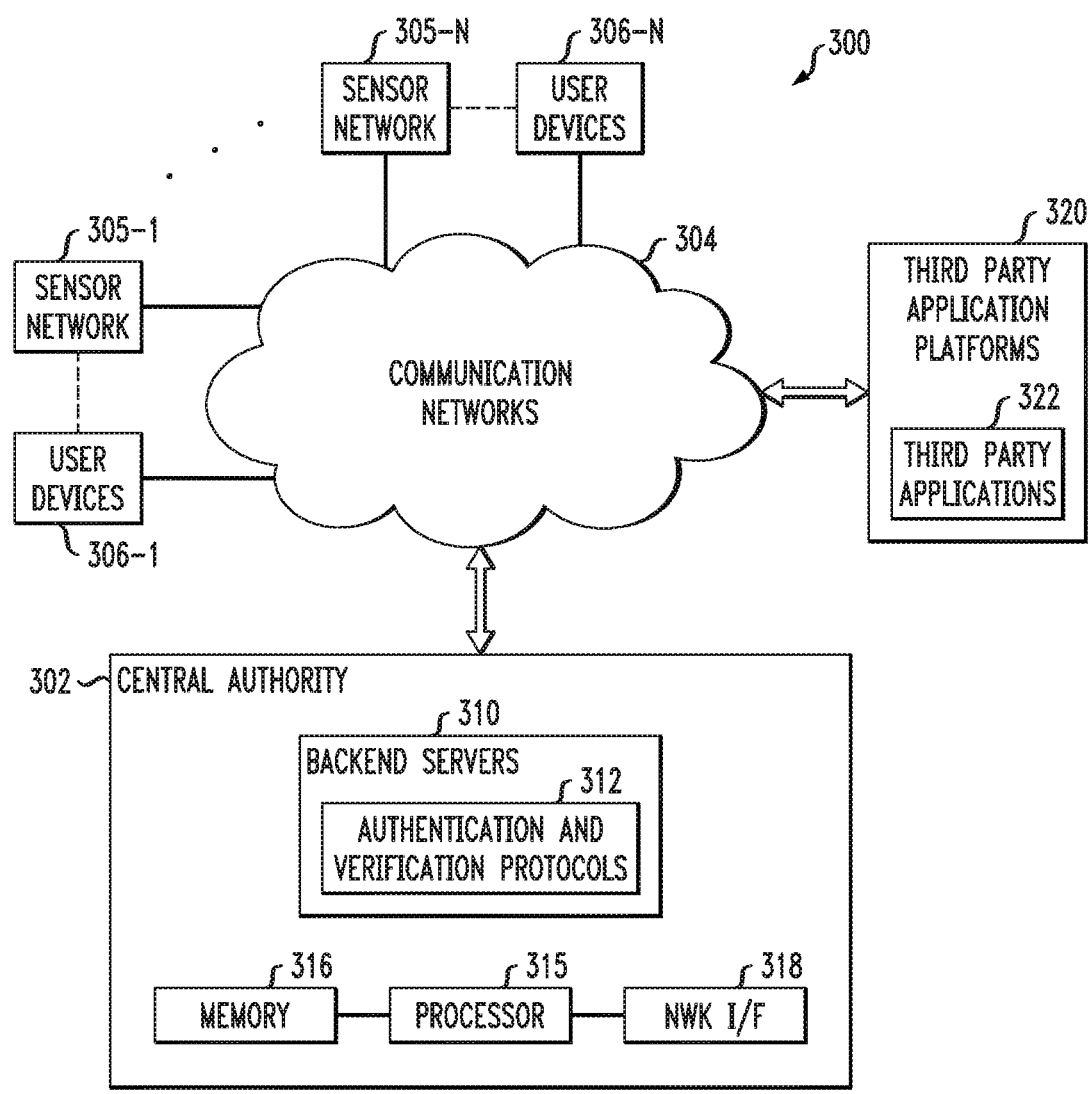

THIRD PARTY APPLICATION ENABLEMENT FOR NODE NETWORKS DEPLOYED IN RESIDENTIAL AND COMMERCIAL SETTINGS

RELATED APPLICATION(S)

The present application claims priority to U.S. Provisional Patent Application Ser. No. 62/756,863, filed Nov. 7, 2018 and entitled "Third Party Application Enablement for Residential and Commercial Buildings," which is incorporated by reference herein in its entirety.

FIELD

The field relates generally to information processing systems, and more particularly to systems that process sensor data.

BACKGROUND

The development of the smartphone opened up doors to new functionality, both as it relates to user interfaces and mobile applications ("apps"). However, it was the app marketplace that acted as a catalyst for a rapid development of services for these devices. The notion of an app marketplace, by itself, is much more intricate than it may seem at first blush, as opening up a device to largely unknown parties running largely unknown code could result in a major security backlash. Accordingly, the management of a functional app marketplace was what really enabled the changes.

While it is not commonly recognized, there is an analogous setting in the context of future Internet of Things (IoT) deployments, wherein collections of sensors are utilized to understand and control homes and offices. These future deployments are likely to comprise vastly more sensor capabilities than what current deployments do; currently, home security companies, for example, typically install less than ten sensors per home. As homes and offices increasingly add sensors, it is not unlikely that typical smart homes will soon have hundreds, if not thousands, of sensors. Such installations will offer great opportunities for organizations able to monitor and control installations, while also helping users to better understand and control their environments. To unleash the capabilities and enable innovation, it is beneficial to enable third party service providers to operate services; however, this poses an even greater threat to end users than the risk of malicious code on smartphones would, as sensor networks, if abused, can be terrifyingly intrusive. Unlike the smartphone context, the problem is not limited to the risk of interference between different domains (such as the domain of data and functionality associated with one app and another). The exposure of sensor data to malicious third parties could very possibly turn smart homes and smart offices into "big brother" platforms and create an ability to damage property. Moreover, malicious third parties, such as hackers, nation state aggressors and criminals, could abuse platforms and their associated data to blackmail users, potentially cause health hazards or suppress health alerts, invade the privacy of users with the goal of influencing their actions, and cause other problems for users.

SUMMARY

Illustrative embodiments provide techniques for third party application enablement for use in conjunction with sensor networks or other types of node networks deployed in residential or commercial buildings, as well as in numerous other settings in which it is desirable to securely control third party application access to sensitive data generated by sensor networks. For example, some embodiments address the problem of how to securely enable third party services on sensor network installations, for the benefit of the users of these systems, and with the protection of these users as a central consideration.

In one embodiment, an apparatus comprises at least one processing device comprising a processor coupled to a memory. The processing device is configured to receive sensor data from one or more nodes of a node network, to compute predicate data based at least in part on the received sensor data, to transmit at least a portion of the received sensor data and the computed predicate data to a third party application, to receive additional data from the third party application responsive to the transmitted portion of the received sensor data and the computed predicate data, to generate a control signal based at least in part on the received sensor data, the computed predicate data, and the received additional data from the third party application, and to transmit the control signal to at least one of the nodes of the node network.

The processing device in some embodiments comprises one or more servers coupled to the node network.

Additionally or alternatively, the processing device illustratively implements a central authority of a trusted party responsible for configuration and management of the node network.

The node network in some embodiments more particularly comprises a sensor network that includes a set of sensor devices with at least one of the sensor devices being configured to generate the sensor data. The sensor network may be deployed, for example, in at least one of an interior space and an exterior space of a building or other structure.

In some embodiments, the third party application executes in a trusted processing environment that is under the control of the trusted party. However, in other embodiments, the third party application can execute in a non-trusted processing environment that is not under the control of the trusted party.

The third party application illustratively comprises one or more software programs of a third party service provider. Third party applications in some embodiments herein are also referred to as "apps." Such apps can include mobile applications, as well as other types of third party applications that execute in cloud infrastructure or on other types of processing platforms outside of a mobile device. Terms such as "third party application" and "app" as used herein are intended to be broadly construed, and in some embodiments can include, for example, an application that includes multiple distinct software components operating on different processing devices or processing platforms.

In some embodiments, computing predicate data based at least in part on the received sensor data comprises computing the predicate data in accordance with one or more user-specified policies relating to access by the third party application to information including or derived from the sensor data.

For example, the computed predicate data illustratively comprises only information that a user has permitted the third party application to access.

In computing predicate data based at least in part on the received sensor data, the computed predicate data may be associated with a pseudonym that prevents the third party application from determining an identifier of a source of the corresponding sensor data.

Additionally or alternatively, computing predicate data based at least in part on the received sensor data can comprise computing the predicate data in accordance with one or more compliance policies, such as policies relating to protection of user data.

In some embodiments, computing predicate data based at least in part on the received sensor data comprises computing, from received sensor data that includes one or more explicit identifiers, anonymized predicate data that does not include the one or more explicit identifiers. The anonymized predicate data may be indicative of, for example, at least one of an activity associated with a user within an area in which the sensor data was collected, and a classification of the user within the area.

In another embodiment, a system comprises a collection of nodes that collectively form a node network, where these nodes comprise sensors and means for communication, and where a node network is connected to a central server, central utility or other type of central authority that receives and processes data from the sensors associated with the network and/or exhibits control over the functionality of the nodes of the network.

In a further embodiment, a system comprises a central authority, which is illustratively, at least in part, in a location separate from the node network, and is illustratively connected to multiple node networks that are not part of the same installation or physical space. For example, the central authority can be housed on one or more servers associated with a service provider, or in a cloud processing environment controlled by the service provider. For clarity and simplicity, we will refer to the service provider in both such cases as a trusted service provider, to distinguish it from a third party service provider, which may not be trusted. We will also, interchangeably, refer to the central authority as the trusted service provider to reflect that fact that it is this party that provides instructions to the cloud service provider or server farm to implement the functionality performed by the central authority.

In yet another illustrative embodiment, a system comprises at least one third party service provider that wishes to provide a service to the users of the node network, with the assistance of the trusted service provider.

These and other illustrative embodiments include but are not limited to systems, methods, apparatus, and computer program products. The illustrative embodiments are advantageously configured to address and solve one or more significant problems of conventional approaches, as outlined in more detail elsewhere herein.

BRIEF DESCRIPTION OF THE DRAWINGS

FIG. 2 is a flow diagram of a process for third party application enablement in an illustrative embodiment.

FIG. 3 is a block diagram of another information processing system that implements functionality for third party application enablement in an illustrative embodiment.

DETAILED DESCRIPTION

Figure 1:
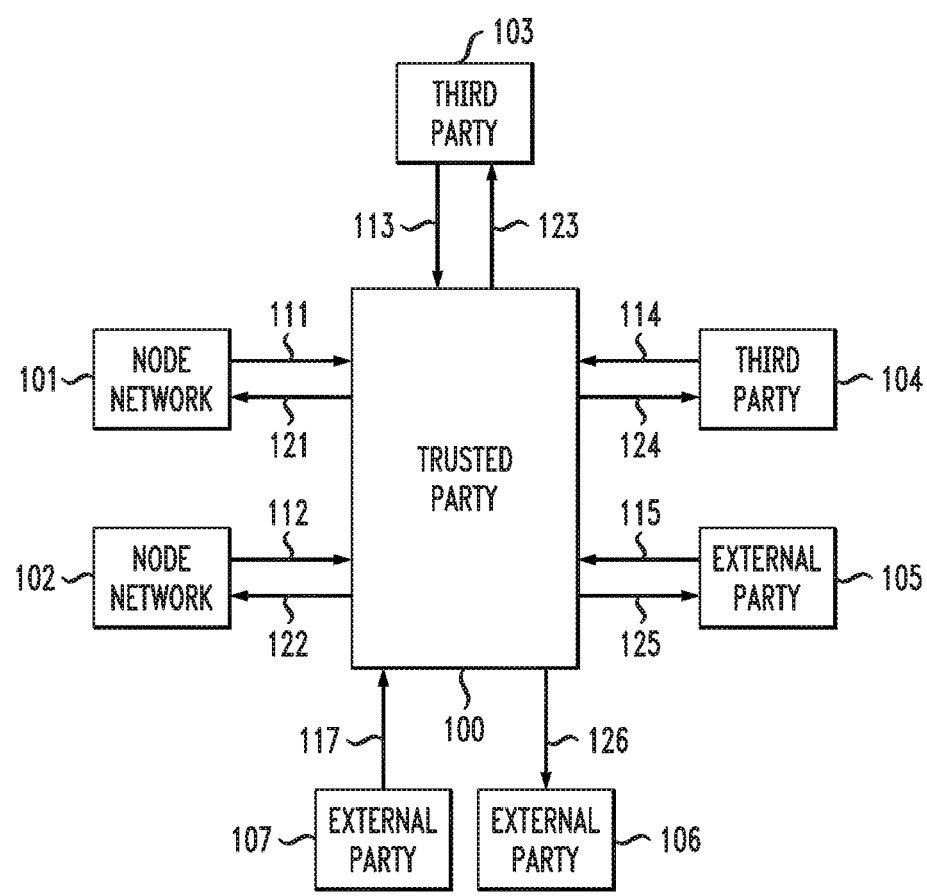
FIG. 1 is a block diagram of an information processing system that implements functionality for third party application enablement in an illustrative embodiment.

Illustrative embodiments will be described herein with reference to exemplary information processing systems and associated computers, servers, storage devices and other processing devices. It is to be appreciated that the embodiments described below are presented by way of example only, and should not be construed as limiting in any way.

In some embodiments, example functionality of the disclosed technology includes a central authority or other trusted service provider being configured to receive data from one or more node networks and, from this data, to generate one or more predicates. Example data comprises output from sensors such as radio transmitters, microphones, motion sensors (including sonal, which uses a microphone), thermometers, and sensors detecting volatile substances such as alcohol fumes, carbon monoxide, etc.

The derivation of predicates from sensor data in some embodiments can be performed at least in part using one or more techniques described in U.S. patent application Ser. No. 16/585,438, filed Sep. 27, 2019 and entitled "Methods and Apparatus for Determining Preferences and Events and Generating Associated Outreach Therefrom," which is incorporated by reference herein in its entirety. Example predicates comprise a description of a user, such as the user's likely gender; the preferences of a user, such as a preference to watch soccer games on TV; and/or the activities of the user, such as hosting parties, cooking or learning to play the guitar; as well as numerous others.

Additional predicates comprise whether any user is present at a location at a particular time. The predicates are less sensitive than the full data from which they are derived. Whereas some of the predicates, such as the location of a user at any one point in time, may be considered invasive, such predicates are justified in some contexts, such as in the context of a fire or other catastrophe, and may be acceptable to share on a limited basis, such as to organizations associated with emergency response.

Yet other predicates are not invasive to typical users, such as whether a user associated with the space is learning to play the guitar; however, it should be understood that some combinations of innocuous predicates may pose a concern to some users, if known to third parties, whereas such users would not be concerned with these third parties knowing any one of the predicates. An example of this general problem is described in L. Sweeney, "Simple Demographics Often Identify People Uniquely," Carnegie Mellon University, Data Privacy Working Paper 3, Pittsburgh Pa., 2000. Analogously, one example of where datasets that appear to be anonymized could be de-anonymized was described in A. Narayanan and V. Shmatikov, "Robust De-anonymization of Large Sparse Datasets," IEEE Symposium on Security and Privacy (SP 2008), May 18-22, 2008.

Accordingly, it is desirable in some embodiments to address situations in which colluding third parties may attempt to combine their inputs to gain insights beyond what is acceptable. These and other issues are addressed in illustrative embodiments through the use of pseudonyms, as will be described in more detail below.

A valuable aspect of providing predicate information to third parties is the creation of profiles associated with the predicate information, where these profiles are associated with identifiers that illustratively are pseudonyms unique both to the sensor networks or associated users, and to the third party service providers. This means that two third party service providers receiving predicate information related to two particular node networks or users would illustratively not be able to determine, if collaborating, that the two node networks or users are the same or related to each other.

In some contexts, however, it may be beneficial to use pseudonyms that are not unique to both the node network or user, and the third party service provider receiving the predicate data. For example, in some contexts it may be acceptable for two third party service providers to be able to determine whether they are observing and controlling the same node network. Furthermore, it may sometimes be beneficial for the pseudonyms not to be used as a method to anonymize the user. For example, a user of a network may wish to associate service he or she is receiving with an email address he or she owns, and to enable the third party service provider to contact him or her directly, without the collaboration of the trusted party. In this context, the email address of the user may be used in place of the pseudonym.

At the other end of the spectrum on anonymity, some pseudonyms are unique not only to a node network or end user, or to the third party service provider obtaining information associated with related predicates, but also unique to a given session. Here, a session may be a period of time, such as three days, or a unique event, such as one transmission of predicate information sent from the trusted service provider to the third party service provider.

Another aspect of the disclosed technology is what we refer to herein as "capabilities." The different types of pseudonyms described above illustratively correspond to different capabilities of the third party service providers obtaining predicates related to the pseudonyms. Another capability is the type of predicates that a given third party service provider gets access rights to, whether these access rights correspond to the right to receive information about the predicates or to initiate state changes associated with the node network. One example state change access right is the right to increase the temperature in a building, another is the right to set the volume for a speaker, and a third is the right to generate messages to the user. Typical users would want to understand what capabilities third party service providers have, illustratively before signing up for service with them.

Thus, a third party service can be described using their capabilities, or classes of capabilities, where one class corresponds to a common set of capabilities, and another class to another common set, and where each service provider can be described as requiring no more capabilities than the set of a given class. This simplifies things for users, who can decide, for example, that they are willing to provide "class C capabilities" to service providers they do not know, but "class E capabilities" to service providers that they trust. Different users may have different preferences, of course, and this approach simplifies the mental burden of assessing service providers and their access to data and control.

One aspect of the disclosed technology relates to reducing the sensitivity of data and associated predicates. For example, a user may be willing to let one third party service provider know whether he or she was in his or her home on a particular day, but not until a week afterwards. Similarly, a user may be willing to let a third party service provider obtain voice commands spoken by a user associated with a node network, but not utterances that are not voice commands or associated with such commands. As yet another example, a user may be willing to let a third party service provider know a frequency representation of the sounds in a home, from which the third party service provider could tell whether the home has a barking dog or not, while the user is not willing to let the third party service provider have access to a time-series representation of the sounds in the home, as this would amount to the third party service provider being able to determine what was being said.

These processing aspects of the data and the predicates also apply to information that is stored (whether by the trusted party or third party service provider), and to how sensor data is transmitted to the trusted service provider from the node network. We refer to these and related processing aspects as "modifiers."

In one embodiment, predicates are computed from sensor data by the trusted service provider. In an alternative embodiment, the predicates are computed from sensor data by one or more nodes that are part of the node network, or otherwise located on the premises associated with the node network. In other embodiments, at least one of the nodes that is part of a node network or located on the premises partially processes sensor data and transmits the partially processed sensor data to the trusted service provider, which then computes one or more predicates from the partially processed sensor data.

In these and other embodiments, the processing associated with computing predicate data from sensor data illustratively comprises, for example, at least a subset of selecting sensor data; aggregating sensor data; performing a Fast Fourier Transform (FFT) on sensor data; delaying the reporting of at least some sensor data or a function thereof; removing duplicates or strongly correlated signals from the sensor data; identifying a user and reporting sensor data associated with the user, but reporting a pseudonym instead of identifying data of the user; and determining, based on a user-controlled policy, what type of sensor data and/or partially processed sensor data to report to the trusted service provider. The determining can be based, for example, on the detection of a condition, such as whether an alarm system has been armed; whether a user is a recognized user or is associated with a recognized media access control (MAC) address or other hardware identifier; the time of the day; the value of a computed predicate; or a combination of these or other conditions.

In some embodiments, the trusted service provider acts as an anonymizer between a node network and its associated users, and a third party service provider. For example, the third party service provider may be provided with certain types of node network usage data, such as how users move around, what type of products they use and what TV programs they watch, but is not provided with information useful to identify or locate the user or the node network, beyond some granular information such as a general area (e.g., a city, a county, a state or a country) or an age group of the user. In particular, the third party service provider would not be allowed to know the exact location of the node network or its users, as well as identifiers associated with the node network or its users, such as email addresses, HTML cookies, MAC addresses, etc.

This permits more detailed usage data to be shared by the trusted party to the third party service provider, since the actions of the users are protected by the anonymization or pseudonymization performed by the trusted party. This also enables the sharing of select sensor data that may be sensitive, as opposed to only select predicate data. The same type of anonymization can also be performed in a context where the third party service provider receives only predicate data and not sensor data, or a combination of such data types. Furthermore, the trusted party may aggregate data between different node networks before providing sensor data and/or predicate data associated with the aggregated sensor data. This is useful for carrying out general lifestyle surveys, characterizing various type of data relating to life in a home, in a manner analogous to Nielsen ratings for TV programs.

Additional aspects of example systems will now be described. Although reference is made below and elsewhere herein to a particular system, it is to be appreciated that the various aspects to be described may be implemented in respective different systems. In addition, different combinations of the various aspects may be implemented in respective different systems. Numerous other arrangements are possible, so references herein to a given "system" should not be viewed as requiring particular features or functionality.

An example system in illustrative embodiments, also referred to herein as a "disclosed system," is particularly designed to avoid abuse. One type of abuse of relevance in the context of sensor networks is intimate partner violence (IPV). With the development of digital technologies, such technologies have come to play a key role in IPV contexts, as abusers exploit them to exert control over their victims. IPV affects roughly one-third of all women and one-sixth of all men in the United States (see S. G. Smith et al., "The national intimate partner and sexual violence survey (NISVS): 2010-2012 state report," 2017.) Thus, it is important to design systems in a responsible manner, to ensure that they are not being harnessed for abuse.

Third party application systems are a potential risk in this context, especially in systems where an abuser has the capabilities to install third party services without the knowledge of the victim. This is exacerbated by asymmetric technology awareness within households, and by complex user interfaces, lackluster audit capabilities, and the difficulty of automatically scanning the code or determining the functionality of services that have a substantial backend component. The fact that many applications may have dual-use purposes also complicates matters, as it means that most uses may be legitimate and desirable, but that the services also have undesirable uses. It is unlikely that much progress can be made by simply reviewing the access rights of applications, as two applications could potentially access the same type of data, while only one of the applications might have dual use or an undesirable and abusive capability.

The disclosed system in one or more embodiments addresses these and other problems, using multiple approaches. For example, one approach includes maintaining an installation and configuration log for the system, wherein all changes, the parties making the changes, and the time of the changes are documented. This enables a user to review recent installations or subscriptions. Similarly, the disclosed system incorporates a tracking method that identifies common constellations of applications and identifies those that do not match some notion of commonality, which could either be set by a user or kept at some threshold value. Third party applications that are identified as unusual could therefore be given extra scrutiny. For example, users could be alerted about the presence of such third party applications, or the user can request a roll-back of the installations/subscriptions or associated configurations. Simply reconfiguring unusual applications will address a large part of the problem, as this prevents exfiltration of data in the most common contexts.

In addition, the system illustratively correlates abuse complaints and other complaints with the constellations of installations and subscriptions, thereby singling out applications whose installation or subscription is commonly associated with abuse. Such applications may be banned from the marketplace of apps if the correlation is very strong, as this suggests an intent of abusive use, or users can be notified of the potential risks for applications with lower correlation, which suggests dual use.

The system illustratively maintains multiple thresholds for the determination of risk for different scenarios. One example scenario is where a user is excluded from a node network, there is a conflict report between registered users, when control is handed over from one user to another, or when one user is obtaining administrative ("admin") rights for a system that is not a fresh installation without any applications. In such contexts, the new user(s) or admin(s) are notified of high-risk applications, where the alert may classify the application according to its correlation with abuse reports as well as whether the application is rare or new enough that there is not sufficient material for performing the correlation effort. Users can choose to remove or cause a reset or a reconfiguration of such applications.

An automated scoring system of this type helps maintain security and an abuse-free marketplace, as it allows the removal of undesirable applications by individual users, and the exclusion of applications that are commonly figuring in abusive scenarios. Users wishing to very quickly change the settings can choose to keep only applications that are sufficiently old and common that statistic information is available to the trusted party to evaluate their correlation with complaints from users, and which do not have a correlation to complaints above a threshold value. Herein, the type of complaint is illustratively taken into consideration in the determination. For example, a user complaint that the system does not select the right music or that the user does not wish to receive advertisements is not relevant in a context of abuse, whereas complaints of unwanted access, attempts to evict users, initiation of access resolution mechanisms among permitted users, and others, are all signs of potential abuse.

In addition, the system identifies contexts that are associated with likely breakups, such as one out of two previously registered users disappearing from a node network for an extended time, apparent conflicts by two users, e.g., changing configurations back and forth, and other indications associated with higher risk of abuse. These contexts and indications are then correlated with installed apps, especially those that are recently installed, and especially apps that are uncommon. Apps with a correlation exceeding a first threshold value, such as 0.4, are given additional scrutiny, included in notifications, etc.; while applications exceeding a second threshold value, such as 0.75 are blocked from the marketplace. By correlating applications to other complaints, other app problems can be automatically and statistically identified, as will be appreciated by a person skilled in the art.

As a more particular example, assume in the context of an illustrative embodiment that the third party service provider is a provider of radiant floors, and wishes to help provide better control to purchasers of their heating systems. Commonly, radiant heat systems comprise coils in the floor, where the coils either are electric coils or coils with water that can be heated by a water heater. However, due to the thermal mass of the floor above and around the coils, heat is retained in the floor and radiates into the room for a long time after it is transferred from the coils. As a result, if a thermostat detects that the temperature is too low in the morning, and starts heating the floors, by the time the sun has risen and started to heat the building and the air in it and the thermostat detects that the right temperature has been reached, the floors contain a large amount of heat. This heat will continue to radiate into the rooms well after the right temperature has been reached, thereby making the rooms too warm and potentially necessitating the resident to turn on the air conditioner to counter the temperature rise.

This cannot be addressed by setting the thermostat at a lower temperature as on a day when it is not as warm outside, the temperature will not rise at the same pace, and the house would end up being too cold. Additionally, different homes will have different heat swings than the one described here, due to the use of different materials. Furthermore, the habits of the residents may affect the response, e.g., one person may go in and out to the deck throughout the day (thereby affecting the indoor temperature) while another may not. Similarly, one person may use heat-generating appliances a lot on one day, but not at all on another; accordingly, the temperature response curve is not even the same from day to day for the same house, even if the weather is the same.

This problem can be dealt with by a central authority that comprises a machine learning system configured to detect the temperature in various locations inside and outside the house, to obtain information about the thermostat settings, and to control the heating of the floor coils. Traditional automated control algorithms, additionally, can be used to identify the changes of temperature within the system and to regulate it using the control of the heating of the coils. Systems like this can be configured to determine the heat retaining capabilities of the floors, which can be done automatically based on the sensor inputs described above. Whereas this can be managed using a local feedback system, this is not optimal. It can also be performed by the trusted party; however, this party might be limited in terms of its business to providing systems and some form of control to users, and not specialized to control the temperature of the system using advanced methods. Different third parties may have different proprietary algorithms to address the problem, with various pros and cons.

Therefore, it is advantageous to be able to outsource the processing and service provision. However, if all customer sensor data were to be sent to the third party, that would be a severe privacy invasion. While the users have a trust relationship with the trusted party, they should not have to place trust in a larger than necessary number of organizations; therefore, it is beneficial that the disclosed technology removes the need for having to trust the third party.

In this embodiment, temperature sensor data (illustratively for all indoor nodes and also for at least one external node, if available) is transmitted to the third party, along with user preference data relating to the preferred temperature schedule. In one embodiment, no further data is transmitted, except for a temporally stable pseudonym that allows the third party to generate a model of the heat transmission and use this to predict what control to apply.

The sensor data does not need to be provided all the time, but could be transmitted every ten minutes, or in accordance with another specified transmission period. The third party transmits control information to the trusted party, tagged with data related to the temporally stable pseudonym, and this control data is transmitted by the trusted party to the node network. In one embodiment, the third party service provider may have sold or installed the physical heating system, and would know additional information, such as the type and thickness of the material above the coils, whether the coils are embedded in wooden panels or in concrete, and other related information. This type of information may allow the third party to fine-tune the model and speed up the conversion speed of the estimator. These techniques also help to identify a failed or failing system. It may also reveal real-life identities of the users, including their address. Since the temperature data could in some instances reveal whether the users are at home or not, e.g., as indicated by a repeated opening and closing of doors, this may be seen as a privacy drawback. A user who is concerned about this may prefer that only partial sensor data is provided, e.g., no temperature data from nodes close to entrance doors.

The trusted party can automatically identify what sensor data is indicative of potentially sensitive actions, e.g., by correlating temperature data with data indicating that doors are opened and closed, such as microphone data, and identifying sensor data that should be excluded. Such data would never be included in the feed to the third party. Thus, one advantage of the disclosed technology is an automatic determination of what sensor data is strongly correlated with potentially sensitive data, of which the system could have a list that is either provided by the user or which is from a template.

In the disclosed system, the trusted party collects sensor data and other user inputs and processes these to obtain derived data; then makes selected data and derived data available to third parties, and optionally receives control data from the third parties, where the control data or data derived from the control data is transmitted by the trusted party to the node network or at least one node associated with the node network, where the node network is at least in part the source of the collected sensor data. Optionally, the trusted party pseudonymizes the information transmitted to third parties.

Another example third party application is a preference derivation system that receives at least some data and derived data associated with a node network, from the trusted party, and determines at least one preference associated with the user(s) of the node network. Example preferences include "the user likes jazz," "the male adult is often accompanied by a dog," "people in this residence like to play ping pong," and "user 1 of the residence sleeps poorly when the temperature is higher than 92° F." The third party that derives such preference observations can do this without any knowledge of the location of the residence (or commercial space); without knowing the names or email addresses of the users; and without any other personally identifiable information. We refer to this third party as the preference determining third party.

Another third party service provider, such as an advertiser, a merchant selling dog toys, or service provider controlling the temperature of the residence (as described above), wishes to acquire data streams of relevance to its business, and pays the preference determining third party for relevant data, with the trusted party acting as a broker of information and payments. For example, a third party wishing to sell dog toys to users of a certain demographics, living in the US, may pay the trusted party $4 for each new referral. The trusted party knows the location of a residence, and has assessed likely demographics, whether by requesting information from users associated with the residence or by observing their behavior based on sensor data that it receives. The trusted party also knows what users it has sold data for relating to the third party wishing to sell dog toys. Therefore, periodically, the third party receives preference data relating to some pseudonyms, where the pseudonyms are illustratively specific to the user(s) as well as the preference determining third party. The third party then collects such preference data and determines what third parties are interested in the preference data, and determines whether the price the third party wishes to pay is sufficient.

Different preference determining third parties may have different pricing structures for preference data, based on the type of preference, the estimated accuracy, and other factors. If the price the third party wishes to pay is sufficient, the trusted party initiates a transaction in which preference data is sent to the third party, in this example, the third party wishing to sell dog toys. The trusted party then performs book-keeping both with respect to the buyer of the preference data and the seller of the preference data. The preference data that is sold is illustratively identified using a pseudonym that is unique to the user(s) to which it relates, as well as to the buyer of the data. Thus, the buyer of the preference data and the seller of the preference data cannot determine whether or not two pseudonyms relate to the same user(s). The third party wishing to sell dog toys may prepare an offer to be sent to the user, whether using the trusted party as an intermediary, or directly, in the case where the third party wishing to sell dog toys has been given a method of contacting the user(s).

Similarly, advertisers may build catalogues of likely preferences for different users, where the pseudonyms may be related to third party cookies or standard HTML cookies set by the third parties by a redirection method as the user(s) visit a webpage related to the trusted party. This allows later detection of a user, as he or she browses the web, where the detection is relative to a preference, such as "this user likes jazz." There may be yet other pricing structures for data used in the context of advertising. In this example, such data is much more long lived than simply a referral of a user, and an associated opportunity to initiate the transmission of a dog toy discount coupon, by the trusted party for example.

The pricing structures may be set by the trusted party, or using market forces in which the trusted party determines the right price using experimentation, illustratively via an auction. Whereas most auctions involve goods or opportunities for which there can only be one auction winner, data such as preference data can be sold to multiple buyers, as long as the third party generating the preference data is willing to sell at that price, and the trusted party is satisfied with the margin it applies to the purchase.

In the above example, there are three different types of service providers: the trusted party; the preference determining third party; and the third party that consumes preferences. The trusted party acts as an intermediary, and also as a privacy representative for the end user. The preference determining third party buys, processes and sells data. In the example above, the prices may be set on a per-transaction basis, both for the purchase and sale of data; however, other monetization methods are also possible, such as the trusted party receiving a share of the profits, or the preference determining third party setting its own prices.

The preference determining third party is an example of a third party that buys and sells data. The data it buys may be sensor data from one or more node networks; predicates related to such sensor data, generated by the trusted party; and/or data purchased from other third parties that buy and sell data (whether directly, or using the trusted party as an intermediary). The other type of third party in this example is a service provider that provides a service to users, where the service may be to set the home temperature in the most appropriate manner; to provide discount coupons or other advertisements selectively; or to perform other types of services.

A further example of a third party application is a billing service that measures the energy consumption associated with one or more network nodes and generates and attributes charges to one or more users. The trusted party determines the energy consumption, per outlet and/or node, for a registered node network, and reports this data to a third party. The energy consumption data may be delayed, e.g., by 48 hours, as a privacy protecting measure. A user may select another time delay as well. The user is provided with registration instructions, which illustratively involves at least one of a smartphone/tablet app and a webpage, where the user is asked to enter payment data. This payment data is collected directly by the third party in one embodiment, and collected and maintained by the trusted party in another embodiment. In the first embodiment, the third party receives pseudonym data associated with the node network; this can, for example, be conveyed in the path of a URL, or provided by the user at configuration time. Alternatively, the trusted party can maintain this data and perform billing of the user according to indications provided by the third party.

The third party associates a collection of network nodes with an account, where the account is associated with at least one of the pseudonym for the installation, a pseudonym of the registered user, payment data such as credit card data or a PayPal user name, and associated data related to user approval to charge. The third party obtains energy consumption data and determines the cost associated with the consumed energy. This may be the actual cost to the payer of the bill, but the cost may also be computed according to another formula, e.g., the cost of using the outlet is $10 for any 24 h period, no matter how much it is used, or the cost to run the water heater, exceeding $5 per day, is to be billed, but not any amount lower than $5.

The charging policy may be provided by or selected by a service subscriber, such as the user, a party paying the bills to the energy company, or provided in other ways. The charges may also include overhead, e.g., the amount to be paid to the third party and the trusted party. In one embodiment, there is no overhead, but the user agrees to other commercial use of the data, e.g., the user may receive advertisements or may have to qualify for an offer by providing demographic information or a discount coupon.

This aspect of the disclosure therefore enables the granular splitting of energy consumption costs, with applications to vacation rental properties, short term corporate rentals, dorm room energy billing, etc. A landlord may include a set amount of energy in the rent, e.g., up to one dollar a day, and the user/tenant would have to pay for any amount in excess. This protects landlords against abusive behavior, such as running the A/C with open doors and windows in the middle of the summer, or the mining of crypto currencies, unwanted charging of electrical vehicles or other highly energy-consuming activities that are not desirable.

In one embodiment, the trusted party acts as a payment network, taking payment from users and performing payments to other parties, including the third party, an owner/landlord, a party that subsidized the node network in exchange for a share of the profits, and/or the electricity company. Similarly, gas consumption is illustratively metered in an analogous way, or inferred from control data sent to gas consuming appliances. In addition, other utilities can be billed for using the disclosed system, including providers of telephone, Internet, TV, etc. The use of these resources can be determined by the node network in embodiments in which the node network is the intermediary used for control of the appliances. Other factors such as conveyance of signals can be used to detect usage.

The billing can be performed in a granular manner in which a user only pays for periods of time when he/she wishes to obtain the service, starting at the time of registration or other enablement, and ending at a preset time, when the user checks out or is detected (e.g., by Global Positioning System (GPS) data associated with the application) as no longer using the services, or when another user registers to pay for the services.

The billing may involve selected outlets, switches, utilities, and usage patterns, but exclude others. A landlord in a location where winters are cold may demand that the thermostat never is set below 50° F., to avoid damage of the property due to freezing of pipes, and may accordingly pay for any heating that is necessary to bring the temperature to this threshold level, but not for energy associated with additional increases of the temperature. Accordingly, the system can determine the estimated costs for the landlord to pay based on the outdoor temperature; historical heating costs at various thermostat settings; user thermostat settings; user actions, such as keeping windows open in the winter; and additional or alternative factors.

The system illustratively also comprises a messaging system that sends notifications to interested parties. For example, a landlord may wish to know if the temperature or the temperature settings exceed or go below preset thresholds, or otherwise are anomalous; whereas the user may wish to know when the energy consumption rate exceeds a threshold value, or may wish to receive a notification every time the user has accrued another $10 bill, or any other amount, as set by the user. Some notifications are generated and transmitted by the third party, whereas others may be generated and transmitted by the trusted party. Notifications may either relate to exact consumption amounts or to estimates. Some notifications sent by the third party may be triggered by the trusted party, which is helpful if the third party receives sensor data and associated predicates in a delayed manner, or if two third parties are used for different utilities (e.g., gas and electricity) but the user has opted for a unified billing or notification.

In embodiments where the trusted party is engaged in payment processing and to ensure strict protection of credit card payment data, it is beneficial for the trusted party to interface with a third party that is a Payment Card Industry Data Security Standard (PCI DSS) compliant payment processor. The third party payment processor would obtain only the necessary session data associated with the business transaction in question and the session data associated with the trusted party system would not be exchanged.

Yet another example of a third party application is one implemented in the context of a residential or commercial alarm system that comprises a node network and an associated trusted party, configured to detect motion and presence and to optionally identify users based on MAC addresses of user devices and other data. The third party application in this example implements a third party service that receives data derived from the sensor data of the node network and determines whether a situation corresponds to a risk of a home invasion or other covered danger, and communicates with one or more users such as residents and/or landlords, and which also may communicate with law enforcement or private security companies. Such an arrangement is beneficial as it enables protection of residences and commercial spaces without deployment of special-purpose sensors, such as window-break sensors. Moreover, the disclosed technology is expected to result in lower operational costs, higher precision, greater opportunities for customization, as well as other advantages.

Multiple competing third parties can use different algorithms to infer risk from data derived from sensor data and auxiliary data provided by the users and/or their appliances and devices, such as a GPS device associated with a user vehicle. The accuracy of advanced sensor networks is expected to be much better than that of traditional systems, which typically rely on a very small number of sensors, most of which are battery operated, and therefore severely constrained in terms of computational capabilities, amount of data communicated, and other functionality.

The third party service provider may also provide additional sensors, such as one or more video cameras, and collect data from these additional sensors. Pre-existing sensors associated with the third party can also be incorporated in the system. This is illustratively done by enabling them to communicate with the node network. Such an arrangement can reduce service costs by avoiding the use of cell phone modems for the communication. It also simplifies the user interface as it can be configured to incorporate all access under a single portal, in the form of an end-user portal for accessing the node network and its associated services. This is illustratively an application for a phone or tablet, dedicated software for a laptop or desktop, or a webpage that is accessible to registered end users.

External data sources can be accessed using pull and/or push technologies. For example, a resource can provide the trusted party with application programming interface (API) access to data for a particular feed or it can transmit updates using a push mechanism. Multiple mechanisms can be used at the same time, to conform to the communication methods already used by the external data source. For example, one external data source can transmit data using standard emails while another may access an API to the trusted party to upload data. The trusted party may mimic the format of an existing application. For example, to get calendar update data, the trusted party may generate an interface matching that of a mailbox, allowing the sharing with the trusted party. This mailbox may correspond to an existing email account of the user whose calendar data is to be uploaded to the trusted party.

The user can sign up for the service by requesting that calendar data be shared with an application corresponding to the trusted party, which illustratively mimics a mailbox or a calendar. Other example external data sources include vehicles and their infotainment systems, phones and their GPS systems, smart appliances that permit uploading of data or connection to services, which can be mimicked by the trusted party to simplify compatibility.

Systems that do not produce data, but instead consume data, can also be connected, such as smart light bulbs. By connecting these to an account of a user, and by permitting access by the trusted party, the user can control such devices from the same portal used to control the other nodes in the network. External units that both generate and consume data can be connected in a manner similar to that described above.

In contexts where third parties or users have data, such as sensor data from sensors they control, manage or distribute, or otherwise receive a feed from, these third parties or users can provide the sensor data to the trusted party, along with a policy describing how the sensor data can be used, and associated with a profile, e.g., a pseudonym or identifier associated with the installation or user. Additional data feeds can be imported to the trusted party in the same way, e.g., email feeds, calendar feeds, and social networking feeds. These can be requested or initiated by an end user associated with the data or data source, and can be associated with a specified policy of use.

One example policy of use is that the data is not allowed to be used to compute any predicate that is provided to a third party. Another example policy is that the data provided to a third party cannot possibly be used to determine personally identifiable information (PII). Yet another policy is that the data must not be associated with the identity of the user, but only with a temporal pseudonym relating to the user's data. A further policy can be a delegated usage policy, meaning the data can be used as seen appropriate by the trusted party, given that the user has a trust relationship with that party.

Other examples of policies include policies that specify what other third parties are allowed to access the provided data or predicates derived from it. These and other policies are illustratively selected by the user, but in some embodiments such policy selection can involve interaction with a third party providing certain types of data. Such approaches are beneficial as they can expand the sensor data from that related directly to sensor hardware associated with the trusted party, allowing essentially any data feed of a standardized format.

In one embodiment, the processing performed by third party service providers, corresponding to respective third party applications, is performed on a cloud platform or other computational platform controlled by or associated with the trusted party. Such a cloud platform may comprise, for example, a cloud hosting environment associated with the trusted party. This enables some degree of oversight and control by the trusted party, and also simplifies and speeds up the processing of sensor data and associated predicate data.

One form of oversight is that the trusted party can scan submitted apps or code units to determine that they comply with security and privacy requirements, similar to how app marketplaces screen apps before they are made available to users. Another is that the trusted party can determine when the apps pass messages to other entities, whether operating in the same platform environment or an external environment, and, under some circumstances, determine the nature of the messages.

In an embodiment with third party service providers' applications hosted within the trusted party hosting environment, it is beneficial to have operating agreements to safeguard the health, security, and privacy of the enterprise, such as security and privacy attestation by third party, and security and auditability of third party code via trusted party. Additionally or alternatively, the trusted party could be provided with administrative rights to enable, disable and remove hosted applications that could present an operational, security, or privacy risk to the enterprise or its users. The trusted party hosting environment can provide environment segregation so as to limit any potential scope of a security risk through the use and implementation of security best practices, industry standards and required governance compliance.

When multiple third parties are connected in a chain, e.g., consume each other's data, it is particularly beneficial for at least a portion of the processing to be performed in one computation environment, as opposed to in a distributed fashion. In one embodiment, at least portions of the computation are performed in computational environments that are not under control by or associated with the trusted party. This is beneficial for third parties that cannot or do not wish to expose at least some of their processing to the trusted party, or that rely on processing that is intrinsically external to the processing environment associated with the node networks. For example, an advertising network may use data from the trusted party to determine preferences of end users, but the application of this data to the selection of advertisements should illustratively be possible to perform on a computational platform controlled by the advertisement network or a third party associated with the advertisement network, as opposed to on the infrastructure controlled by the trusted party.

In this example, the functionality is partitioned into different aspects, some of which are performed external to the platform associated with the trusted party, whereas other parts are performed either on the platform associated with the trusted party or on another platform. There are processing benefits associated with performing at least some processing on the platform associated with the trusted party. Some of this processing is under the full control of the trusted party, i.e., the code is provided by the trusted party or associated entities, whereas other parts of the processing may be performed by one or more third party service providers on the platform associated with or controlled by the trusted party. A person skilled in the art will appreciate that a tight integration of processes, in which code associated with the trusted party and one or more third parties is executing on the same processing platform, results in benefits of many types, including but not limited to faster processing, lower communication costs, greater robustness, and better oversight.

Additional illustrative embodiments will now be described in further detail with reference to FIGS. 1 through 3.

FIG. 1 shows an example information processing system in an illustrative embodiment. A trusted party 100 receives data from node network 101, node network 102, third party 103, third party 104, external party 105 and external party 107. The data transmitted in 111 from node network 101 and the data transmitted in 112 from node network 102 comprises sensor data and data derived from sensor data. In addition, users associated with node network 101 and node network 102 can provide the trusted party 100 with configuration data and additional data (not shown). Trusted party 100 also receives data 113 from third party 103, data 114 from third party 104, data 115 from external party 105, and data 117 from external party 107, and generates, from this received data, combined data (not shown), whether by combining data of the various sources, deriving new data based on the data from the various sources, or both.

The combined data, or at least part of it, is transmitted in 123 to third party 103, in 124 to third party 104, in 125 to external party 105, and in 126 to external party 106. In addition, the combined data, or at least part of it, is sent in the form of control data 121 to node network 101 and control data 122 to node network 102. Here, control data 121 and 122 configures node network 101 and node network 102. At least some of the data 113 transmitted by third party 103 is transmitted 124 to third party 104. A third party is primarily a source of processing of data, but may also contribute data it obtains from sources other than the trusted party 100. An external party such as external party 107 is primarily a source of sensor data or related data, or (as external party 106) a recipient of control data 126 used to configure a system associated with external party 106, but both a recipient of control data 125 and source of sensor data 115 as in the example of external party 105. External parties also optionally perform some processing, but are primarily used as sources or destinations of data.

Node networks 101 and 102 are typically under the full control of the trusted party 100, which may, for example, update firmware associated with individual nodes of node network 101 and node network 102. External parties 105, 106 and 107 are typically not under the full control of trusted party 100, although in some embodiments, trusted party 100 is provided with access rights to fully control such external parties. Third party 103 illustratively comprises one or more software processes running on a platform controlled by trusted party 100, where such a platform could, in one example, be a cloud platform, and in another, a processing environment on the same premises as the processing environment of trusted party 100. On the other hand, third party 104 illustratively comprises one or more software processes that are not running on a platform controlled by the trusted party 100 or on the same premises as the process associated with trusted party 100. Thus, the messaging corresponding to flows 113 and 123 are performed by passing data using APIs, using buffers, or using messaging within one computer system, whereas the flows 114 and 124 correspond to transmissions of data over a network, such as the Internet, from one processing environment to another. The external parties correspond at least in part to a physical system that is associated with an installation of sensors or output devices, such as loudspeakers, screens, or actuators.

FIG. 2 shows an example processing flow from the perspective of the trusted party 100. In step 201, the trusted party 100 receives sensor data from node network 101, where the sensor data comprises at least one of raw data from at least one node of the associated node network and a function of raw data from at least one node of the associated node network. Example raw sensor data comprises motion sensor data. An example of a function of raw data is an FFT of microphone data from a selected time period. In step 202, trusted party 100 optionally computes a predicate related to the sensor data received in step 201. An example predicate is that a user associated with the node network 101 is in the kitchen, and another example predicate is that a user associated with the node network often listens to jazz music at a loud volume.

In step 203, trusted party 100 transmits at least some of the sensor data received in step 201 and some of the predicate data computed in step 202 to a first third party, which may be either third party 103 or third party 104. In step 204, the trusted party 100 receives data from the first third party 103 or 104. In optional step 205, trusted party 100 transmits data to a second third party, where said data comprises at least in part sensor data received in step 201, predicate data computed in step 202, and data from first third party received in 204. In step 206, trusted party 100 receives data from second third party, assuming optional step 205 was performed. The dashed line in the figure indicates that steps 205 and 206 may be bypassed, with the flow instead proceeding from step 204 into step 207 as indicated.

In step 207, trusted party 100 processes data, where said processed data comprises sensor data received in step 201, predicate data computed in step 202, data received from first third party in step 204, and optional data received from second third party in step 206 if steps 205 and 206 are not bypassed. The result of the processing is illustratively the generation of at least one control signal. In addition, the trusted party 100 optionally stores at least some of the processed data, for example, in a database or other repository. In step 208, trusted party 100 sends the generated control signal to node network 101.

The particular processing operations shown in the diagrams of FIGS. 1 and 2 above are presented by way of example only, and should not be construed as limiting in any way. For example, the ordering of the steps in FIG. 2 can be varied, and additional or alternative steps can be used in place of the particular steps shown. It is also possible that certain steps can be performed at least in part concurrently with one another instead of in the particular order illustrated in the flow diagrams.

Referring now to FIG. 3, an example information processing system 300 of an illustrative embodiment is shown. The system 300 in this embodiments is configured with functionality for third party application enablement. For example, the system 300 is illustratively configured to execute processes of the type previously described in conjunction with FIGS. 1 and 2. At least some of the smart nodes illustratively comprise respective sensor devices of one or more sensor networks, although additional or alternative types of smart nodes can be used in other embodiments. A given such smart node in some instances includes a limited user interface, but other types of smart nodes can include more complex user interfaces.

The system 300 in the present embodiment more particularly comprises a central authority 302 coupled via one or more communication networks 304 to a plurality of distinct sensor networks 305-1, . . . 305-N. Each such sensor network is assumed to comprise a set of sensor devices of the type described elsewhere herein. A given set of sensor devices is also referred to herein as a "collection" of sensor devices. The sensor networks 305-1, . . . 305-N interact with respective sets of user devices 306-1, . . . 306-N. The sets of user devices 306 are not necessarily disjoint, as some of the user devices can interact with multiple ones of the sensor networks 305. The user devices 306 can comprise, for example, desktop, laptop or tablet computers, mobile telephones, smart watches, gaming systems or other types of devices associated with one or more system users and capable of communicating with central authority 302 over the one or more communication networks 304.

Some of the user devices 306 comprise respective instances of what are generally referred to herein as "mobile devices" and those can include, for example, laptop or tablet computers, mobile telephones or smartphones, smart watches, etc. Other types of mobile devices can be used in other embodiments, and the term "mobile device" as used herein is therefore intended to be broadly construed.

The dashed lines between the user devices 306 and the sensor networks 305 are intended to encompass a wide variety of different types of interaction that can be supported in a given implementation. Such interactions are not limited to machine-to-machine communications using wired or wireless communication protocols, but more generally encompass visual, aural, haptic and/or other types of interaction. For example, a sensor device can present an image to a user via a display, and/or play an audio file to a user via a speaker, in conjunction with the implementation of one or more processes for third party application enablement as described elsewhere herein.

The central authority 302 illustratively comprises a processing platform that includes one or more processing devices. For example, the central authority 302 can be implemented as one or more computers, servers or other backend devices that are configured to interact with the sensor networks 305 and the user devices 306. In other embodiments, multiple separate central authorities can be provided, each having responsibility for configuration and management of a different subset of the sensor networks 305. The central authority 302 can include additional or alternative components, such as, for example, a database or other repository of the type referred to elsewhere herein. The term "central authority" as used herein is intended to be broadly construed, so as to encompass a computer, server or backend device coupled to a network, and should not be viewed as requiring any particular geographical relationship relative to the particular sensor networks 305 for which it is responsible. It is illustratively referred to as "central" in this embodiment in that it provides a common control point for configuration and management of the sensor networks 305.

Similarly, the term "backend server" as used herein is intended to be broadly construed, so as to encompass a server that is reachable over a network connection from a user device, and performs various backend-type functions relating configuration and management of nodes of one or more of the sensor networks 305, such as performing authentication and verification protocols 312 in conjunction with establishing associations between particular sensor devices or other types of nodes and a user account.

The "user" associated with a particular user account may be an individual human being, such as a homeowner, tenant or installer, but the term "user" should be understood to include other types of entities, including by way of example, hardware and/or software entities, such as robots and other automated entities configured with machine learning functionality or other forms of artificial intelligence. A given such user illustratively has at least one communication address (e.g., IP address, email address, mobile telephone number, etc.) or other contact information recorded with the central authority 302 in association with the user account. Such a user may but need not have previously gone through a registration process with the central authority 302. Instead, by way of example, contact information for that user may have been provided by another user that has gone through a registration process. Other techniques can be used to register users as that term is broadly used herein.

One or more of the sensor networks 305 may each comprise a plurality of sensor devices deployed within an interior space and/or an exterior space of a building or other structure associated with a residence or business. Such sensor devices are considered examples of what are more generally referred to herein as "nodes" of a set of nodes. The "nodes" as that term is broadly used herein can include smart nodes with limited user interfaces, smart nodes with more complex user interfaces, smart nodes with no user interfaces, and other types of nodes, as well as various combinations thereof. Numerous other arrangements are possible.

As indicated previously, illustrative embodiments advantageously provide enhanced security in these and other situations involving third party application enablement. It is to be appreciated, however, that other types of sensor systems, and more generally other sets of nodes, can be utilized in other embodiments. Accordingly, embodiments disclosed herein should not be viewed as being limited in any way to use with particular types of sensor systems.

The central authority 302 in the present embodiment comprises a plurality of backend servers 310 that implement protocols 312 for authentication, verification and other security-related functions within the system 300. For example, the protocols 312 include one or more authentication and/or verification protocols carried out in conjunction with third party application enablement as disclosed herein.

The backend servers 310 and their associated protocols 312 of the central authority 302 are illustratively implemented at least in part in the form of software running on one or more processing devices, each of which includes a processor 315 coupled to a memory 316 and a network interface ("Nwk I/F") 318. Example implementations of such components are described in more detail below.

The system 300 further comprises third party application platforms 320 coupled to the one or more communication networks 304. Each such third party application platform comprises one or more third party applications 322. Although shown as separate from the central authority 302 in the figure, at least a subset of the third party application platforms 320 and their respective third party applications 322 may be encompassed by the central authority 302. For example, such platforms and applications can be provided in some embodiments using a subset of the backend servers 310 of the central authority 302. Moreover, at least portions of one or more of the third party applications 322 can execute at least in part on one of the user devices 306, or on other system processing devices.

As indicated previously, terms such as "third party application" and "app" as used herein are intended to be broadly construed, and in some embodiments can include, for example, an application that includes multiple distinct software components operating on different processing devices or processing platforms.

A given one of the third party applications 322 can comprise, for example, one or more software programs of a third party service provider. Such a third party application illustratively executes in a trusted processing environment that is under the control of a trusted party such as central authority 302. Accordingly, one or more of the third party application platforms 320 may be under the control of the central authority 302, although such third party application platforms are shown as separate from the central authority 302 in the figure. It is also possible that a third party application may execute in a non-trusted processing environment that is not under the control of the trusted party. Thus, one or more of the third party application platforms 320 may not be under the control of the central authority 302. Various combinations of trusted and non-trusted processing environments may be used to implement different ones of the third party application platforms 320 in illustrative embodiments.

In operation, at least one processing device of the system 300, such as a processing device that implements a given one of the backend servers 310 of the central authority 302, is configured to receive sensor data from one or more sensor devices of at least one of the sensor networks 305. As indicated previously, such sensor devices are examples of what are more generally referred to herein as "nodes" and the corresponding sensor networks are examples of what are more generally referred to herein as "node networks." It is therefore to be appreciated that other types of nodes and node networks can be used in other embodiments.

The above-noted processing device is further configured to compute predicate data based at least in part on the received sensor data, to transmit at least a portion of the received sensor data and the computed predicate data to one of the third party applications 322, to receive additional data from the third party application 322 responsive to the transmitted portion of the received sensor data and the computed predicate data, to generate a control signal based at least in part on the received sensor data, the computed predicate data, and the received additional data from the third party application, and to transmit the control signal to at least one of the sensor networks 305, such as to one of the sensor devices of the sensor network or to another type of node of another type of node network of the system 300. It is also possible that a control signal may additionally or alternatively be transmitted to one of the user devices 306.

A given "control signal" as the term is broadly used herein can comprise, for example, one or more commands, such as, for example, a single command directed to a particular node, multiple commands directed to a particular node, or different sets of one or more commands directed to respective nodes, in one or more node networks.

In some embodiments, the central authority 302 comprises or is otherwise associated with a trusted party responsible for configuration and management of one or more of the sensor networks 305 or other node networks of the system 300. The above-noted processing device illustratively implements at least a portion of the central authority 302, such as one or more of the backend servers 310. Multiple processing devices can also be used, in place of a single processing device.

Such a processing device or set of processing devices in computing predicate data based at least in part on the received sensor data illustratively computes the predicate data in accordance with one or more user-specified policies relating to access by the third party application to information including or derived from the sensor data. Examples of such policies are provided elsewhere herein. The computed predicate data illustratively comprises only information that a user has permitted the third party application to access.

Additionally or alternatively, computing predicate data based at least in part on the received sensor data illustratively comprises associating the computed predicate data with a pseudonym that prevents the third party application from determining an identifier of a source of the corresponding sensor data.

The computation of the predicate data in some embodiments further involves computing the predicate data in accordance with one or more compliance policies, such as policies designed to protect PII of system users. These include data privacy policies such as the General Data Protection Regulation (GDPR) of the European Union, as well as a wide variety of other types of governmental policies.

In some embodiments, computing predicate data based at least in part on the received sensor data more particularly comprises computing, from received sensor data that includes one or more explicit identifiers, anonymized predicate data that does not include the one or more explicit identifiers. The anonymized predicate data in such embodiments may be indicative of at least one of an activity associated with a user within an area in which the sensor data was collected, and a classification of the user within the area.

As noted above, the central authority 302 in some embodiments implements a trusted processing environment comprising one or more of the third party application platforms 320 configured to execute one or more of the third party applications 322. A given such trusted processing environment is illustratively configured to obtain sensitive data, and to allow third party applications created by third party service providers to execute in the trusted processing environment. Inputs are illustratively provided to the third party applications in the form of predicates of the type described herein, with the predicates being computed as functions of the sensitive data, and with the predicates illustratively corresponding to information for which the user has expressly granted access to the third party service provider.

A trusted processing environment in some embodiments is additionally or alternatively configured to enforce best practices and industry standards, such as making sure that the computation meets government compliance.

As a more particular example, a trusted processing environment provided by a trusted party such as central authority 302 in illustrative embodiments herein can be implemented in the form of a scalable cloud environment utilizing virtual machines that can access specified APIs according to their approved permissions. For example, the trusted party may be configured to define the APIs, to determine what virtual machines to create and what third party application software to run in them, and to control how the virtual machines access data and send information to outside entities. The trusted party can run multiple instances of a virtual machine with the same content, and provide it with different inputs, some of which may not be real sensor data, but are instead synthetically generated for testing of the system. The trusted party can also determine whether the third party application software running in a given instance of the virtual machine complies with a set of rules.

In some embodiments, the third party applications can execute in whole or in part outside of a trusted processing environment. For non-trusted processing environments of this type, the predicates are illustratively associated with a pseudonym that may change over time. The third party service provider does not know the mapping from the pseudonym to an identifier of the source of the sensitive data.

The particular features and other advantages described above are examples presented in the context of illustrative embodiments, and therefore such features and advantages need not be present in other embodiments. Such features and advantages of illustrative embodiments should not be viewed as limiting in any way.

For example, references herein to "a system" or "the system" in conjunction with various distinct types of features or functionality should not be construed as a requirement that all such features or functionality be present within the same single system. Instead, different systems in different embodiments can include different combinations or other arrangements of the various disclosed features and functionality.

Also, references herein to particular features or other aspects as being "optional" refer to utilization in one or more particular embodiments, and should not be construed as an indication that any other features or aspects, such as features or aspects not explicitly referred to as optional, are required in any particular embodiments.

Illustrative embodiments disclosed herein include systems, methods, apparatus and computer program products comprising non-transitory storage media storing program code.

The above-described system and other processing entities described herein may be part of an information processing system. A given such entity in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, a microcontroller, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination. As indicated previously, processing devices can comprise respective servers.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

Each processing device of the processing platform comprises a processor coupled to a memory. As indicated above, the processor may comprise a microprocessor, a microcontroller, an ASIC, an FPGA, a CPU, an ALU, a DSP, a GPU or other type of processing circuitry, as well as portions or combinations of such circuitry elements. The memory may comprise RAM, ROM, flash memory or other types of memory, in any combination.

Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM, flash memory or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system level virtualization infrastructure comprising Docker containers or other types of containers implemented using respective Linux kernel control groups. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of systems as disclosed herein can be implemented at least in part in the form of one or more software programs stored in memory and executed by a processor of a processing device. Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another. The ordering of such process steps can also be varied relative to their ordering in illustrative embodiments.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative third party application enablement related processing contexts. Also, the particular types and configurations of system entities, processing devices and process operations can be varied in other embodiments. In addition, the particular assumptions made herein in the context of describing aspects of certain illustrative embodiments need not apply in other embodiments. These and numerous other alternative embodiments will be readily apparent to those skilled in the art.

What is claimed is:

1. An apparatus comprising:
    at least one processing device comprising a processor coupled to a memory;
    said at least one processing device being configured:
        to receive sensor data from one or more nodes of a node network;
        to compute first and second predicate data based at least in part on the received sensor data;
        to transmit at least a first portion of the received sensor data and the first computed predicate data to a first one of a set of two or more third party applications associated with the node network;
        to transmit at least a second portion of the received sensor data and the second computed predicate data to a second one of the set of two or more third party applications;
        to receive additional data from at least one of the first one of the set of two or more third party applications and the second one of the set of two or more third party applications responsive to at least one of the transmitted first and second portions of the received sensor data and at least one of the first and second computed predicate data;
        to generate a control signal based at least in part on the received sensor data, at least one of the first and second computed predicate data, and the received additional data from said at least one of the first one of the set of the two or more third party applications and the second one of the set of two or more third party applications; and
        to transmit the control signal to at least one of the nodes of the node network;
    wherein the first and second computed predicate data are associated with respective first and second pseudonyms configured to prevent the first one of the set of two or more third party applications and the second one of the set of two or more third party applications from combining the first and second portions of the sensor data to obtain designated information that a user has not permitted the first one of the set of two or more third party applications and the second one of the set of two or more third party applications to access;
    wherein said at least one processing device is further configured:
        to assign, based at least in part on whether the first one of the set of two or more third party applications exhibits at least a threshold level of commonality with one or more other ones of the set of two or more third party applications associated with the node network, a first set of one or more classes of capabilities to the first one of the set of two or more third party applications;
        to assign, based at least in part on whether the second one of the set of two or more third party applications exhibits at least the threshold level of commonality with one or more other ones of the set of two or more third party applications associated with the node network, a second set of one or more classes of capabilities to the second one of the set of two or more third party applications, the second set of one or more classes of capabilities being different than the first set of one or more classes of capabilities;
        to select the first and second pseudonyms based at least in part on the first set of one or more classes of capabilities assigned to the first one of the set of two or more third party applications and the second set of one or more classes of capabilities assigned to the second one of the set of two or more third party applications; and
        to control a relative timing of (i) the transmission of the computed first predicate data to the first one of the set of two or more third party applications and (ii) the transmission of the computed second predicate data to the second one of the set of two or more third party applications based at least in part on the first set of one or more classes of capabilities assigned to the first one of the set of two or more third party applications and the second set of one or more classes of capabilities assigned to the second one of the set of two or more third party applications; and
    wherein the first and second pseudonyms each comprise one of a first type of pseudonym that is the same for two or more sessions and a second type of pseudonym that is unique to a given one of the two or more sessions.

2. The apparatus of claim 1 wherein said at least one processing device comprises one or more servers coupled to the node network.

3. The apparatus of claim 1 wherein said at least one processing device implements a central authority of the trusted party responsible for configuration and management of the node network.

4. The apparatus of claim 3 wherein at least one of the first one of the set of two or more third party applications and the second one of the set of two or more third party applications executes in a trusted processing environment that is under a control of the trusted party.

5. The apparatus of claim 3 wherein at least one of the first one of the set of two or more third party applications and the second one of the set of two or more third party applications executes in a non-trusted processing environment that is not under a control of the trusted party.

6. The apparatus of claim 1 wherein at least one of the first one of the set of two or more third party applications and the second one of the set of two or more third party applications comprises one or more software programs of a third party service provider.

7. The apparatus of claim 1 wherein the node network comprises a sensor network that includes a set of sensor devices with at least one of the sensor devices being configured to generate the sensor data.

8. The apparatus of claim 7 wherein the sensor network is deployed in at least one of an interior space and an exterior space of a building or other structure.

9. The apparatus of claim 1 wherein computing the first and second predicate data based at least in part on the received sensor data comprises computing the first and second predicate data in accordance with one or more user-specified policies relating to access by the first one of the set of two or more third party applications and the second one of the set of two or more third party applications to information including or derived from the sensor data.

10. The apparatus of claim 1 wherein computing the first and second predicate data based at least in part on the received sensor data comprises associating the first and second computed predicate data with the first and second pseudonyms that prevent the first one of the set of two or more third party applications and the second one of the set of two or more third party applications from determining an identifier of a source of the corresponding sensor data.

11. The apparatus of claim 1 wherein computing the first and second predicate data based at least in part on the received sensor data further comprises computing the first and second predicate data in accordance with one or more compliance policies.

12. The apparatus of claim 1 wherein computing the first and second predicate data based at least in part on the received sensor data comprises computing, from received sensor data that includes one or more explicit identifiers, anonymized predicate data that does not include the one or more explicit identifiers.

13. The apparatus of claim 12 wherein the anonymized predicate data is indicative of at least one of an activity associated with a user within an area in which the sensor data was collected, and a classification of the user within the area.

14. A method comprising:
receiving sensor data from one or more nodes of a node network;
computing first and second predicate data based at least in part on the received sensor data;
transmitting at least a first portion of the received sensor data and the first computed predicate data to a first one of a set of two or more third party applications associated with the node network;
transmitting at least a second portion of the received sensor data and the second computed predicate data to a second one of the set of two or more third party applications;
receiving additional data from at least one of the first one of the set of two or more third party applications and the second one of the set of two or more third party applications responsive to at least one of the transmitted first and second portions of the received sensor data and at least one of the first and second computed predicate data;
generating a control signal based at least in part on the received sensor data, at least one of the first and second computed predicate data, and the received additional data from said at least one of the first one of the set of two or more third party applications and the second one of the set of two or more third party applications; and
transmitting the control signal to at least one of the nodes of the node network;
wherein the first and second computed predicate data are associated with respective first and second pseudonyms configured to prevent the first one of the set of two or more third party applications and the second one of the set of two or more third party applications from combining the first and second portions of the sensor data to obtain designated information that a user has not permitted the first one of the set of two or more third party applications and the second one of the set of two or more third party applications to access;
wherein the method further comprises:
assigning, based at least in part on whether the first one of the set of two or more third party applications exhibits at least a threshold level of commonality with one or more other ones of the set of two or more third party applications associated with the node network, a first set of one or more classes of capabilities to the first one of the set of two or more third party applications;
assigning, based at least in part on whether the second one of the set of two or more third party applications exhibits at least the threshold level of commonality with one or more other ones of the set of two or more third party applications associated with the node network, a second set of one or more classes of capabilities to the second one of the set of two or more third party applications, the second set of one or more classes of capabilities being different than the first set of one or more classes of capabilities;
selecting the first and second pseudonyms based at least in part on the first set of one or more classes of capabilities assigned to the first one of the set of two or more third party applications and the second set of one or more classes of capabilities assigned to the second one of the set of two or more third party applications; and
controlling a relative timing of (i) the transmission of the computed first predicate data to the first one of the set of two or more third party applications and (ii) the transmission of the computed second predicate data to the second one of the set of two or more third party applications based at least in part on the first set of one or more classes of capabilities assigned to the first one of the set of two or more third party applications and the second set of one or more classes of capabilities assigned to the second one of the set of two or more third party applications;
wherein the first and second pseudonyms each comprise one of a first type of pseudonym that is the same for two or more sessions and a second type of pseudonym that is unique to a given one of the two or more sessions; and
wherein the method is performed by at least one processing device comprising a processor coupled to a memory.

15. The method of claim 14 wherein computing the first and second predicate data based at least in part on the received sensor data comprises computing the first and second predicate data in accordance with one or more user-specified policies relating to access by the first one of the set of two or more third party applications and the second one of the set of two or more third party applications to information including or derived from the sensor data.

16. The method of claim 14 wherein computing the first and second predicate data based at least in part on the received sensor data comprises associating the first and second computed predicate data with the first and second pseudonyms that prevent the first one of the set of two or more third party applications and the second one of the set of two or more third party applications from determining an identifier of a source of the corresponding sensor data.

17. A computer program product comprising a non-transitory processor-readable storage medium having stored therein program code of one or more software programs, wherein the program code when executed by at least one processing device causes said at least one processing device:
to receive sensor data from one or more nodes of a node network;
to compute first and second predicate data based at least in part on the received sensor data;
to transmit at least a first portion of the received sensor data and the first computed predicate data to a first one of a set of two or more third party applications associated with the node network;
to transmit at least a second portion of the received sensor data and the second computed predicate data to a second one of the set of two or more third party applications;
to receive additional data from at least one of the first one of the set of two or more third party applications and the second one of the set of two or more third party applications responsive to at least one of the transmitted first and second portions of the received sensor data and at least one of the first and second computed predicate data;
to generate a control signal based at least in part on the received sensor data, at least one of the first and second computed predicate data, and the received additional data from said at least one of the first one of the set of two or more third party applications and the second one of the set of two or more third party applications; and
to transmit the control signal to at least one of the nodes of the node network;
wherein the first and second computed predicate data are associated with respective first and second pseudonyms configured to prevent the first one of the set of two or more third party applications and the second one of the set of two or more third party applications from combining the first and second portions of the sensor data to obtain designated information regarding that a user has not permitted the first one of the set of two or more third party applications and the second one of the set of two or more third party applications;
wherein the program code when executed further causes said at least one processing device:
to assign, based at least in part on whether the first one of the set of two or more third party applications exhibits at least a threshold level of commonality with one or more other ones of the set of two or more third party applications associated with the node network, a first set of one or more classes of capabilities to the first one of the set of two or more third party applications;
to assign, based at least in part on whether the second one of the set of two or more third party applications exhibits at least the threshold level of commonality with one or more other ones of the set of two or more third party applications associated with the node network, a second set of one or more classes of capabilities to the second one of the set of two or more third party applications, the second set of one or more classes of capabilities being different than the first set of one or more classes of capabilities;
to select the first and second pseudonyms based at least in part on the first set of one or more classes of capabilities assigned to the first one of the set of two or more third party applications and the second set of one or more classes of capabilities assigned to the second one of the set of two or more third party applications; and
to control a relative timing of (i) the transmission of the computed first predicate data to the first one of the set of two or more third party applications and (ii) the transmission of the computed second predicate data to the second one of the set of two or more third party applications based at least in part on the first set of one or more classes of capabilities assigned to the first one of the set of two or more third party applications and the second set of one or more classes of capabilities assigned to the second one of the set of two or more third party applications; and
wherein the first and second pseudonyms each comprise one of a first type of pseudonym that is the same for two or more sessions and a second type of pseudonym that is unique to a given one of the two or more sessions.

18. The computer program product of claim 17 wherein computing the first and second predicate data based at least in part on the received sensor data comprises computing the first and second predicate data in accordance with one or more user-specified policies relating to access by the first one of the set of two or more third party applications and the second one of the set of two or more third party applications to information including or derived from the sensor data.

19. The computer program product of claim 17 computing the first and second predicate data based at least in part on the received sensor data comprises associating the first and second computed predicate data with the first and second pseudonyms that prevent the first one of the set of two or more third party applications and the second one of the set of two or more third party applications from determining an identifier of a source of the corresponding sensor data.

20. The apparatus of claim 1 wherein said at least one processing device is further configured:
to identify a security risk associated with operation of the first one of the set of two or more third party applications in combination with the second one of the set of two or more third party applications, the identified security risk being based on a determination that at least one of the first one of the set of two or more third party applications and the second one of the set of two or more third party applications do not share at least the threshold level of commonality with a plurality of third party applications to which respective portions of the received sensor data are transmitted; and
to modify at least one of the first and second portions of the received sensor data transmitted to at least one of the first one of the set of two or more third party applications and the second one of the set of two or more third party applications responsive to identifying the security risk.

* * * * *